June 29, 1926.
J. C. BOHMKER
1,590,493
FLYWHEEL
Filed April 2, 1925
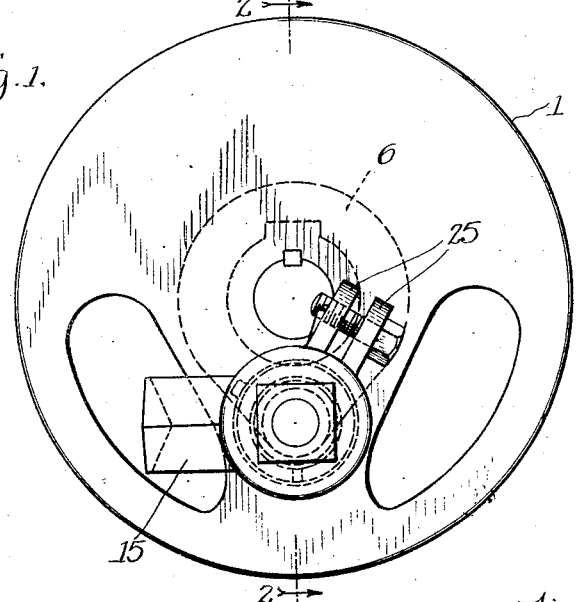
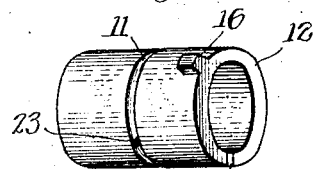
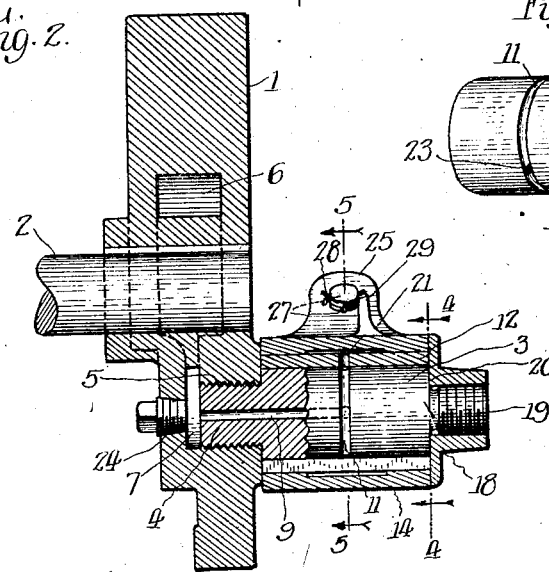
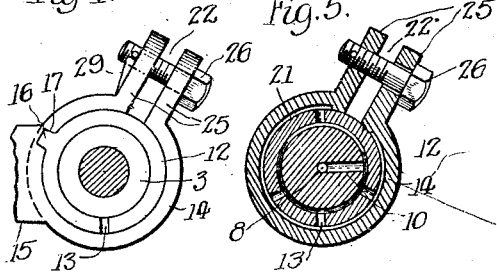
Inventor:
John C. Bohmker,
By Chindell Parker Carlson
Attys.

Patented June 29, 1926.

1,590,493

UNITED STATES PATENT OFFICE.

JOHN C. BOHMKER, OF KANKAKEE, ILLINOIS, ASSIGNOR TO SEARS, ROEBUCK AND CO., OF CHICAGO, ILLINOIS, A CORPORATION OF NEW YORK.

FLYWHEEL.

Application filed April 2, 1925. Serial No. 20,097.

This invention relates to fly wheels for mowers, reapers or like machines, and more particularly to a fly wheel incorporating an oiling system for a pitman bearing associated with the fly wheel.

Because of the heavy duty placed on the pitman bearing of a machine of this type, considerable difficulty has been experienced in oiling the bearing adequately and preventing excessive wear.

One object of this invention is to provide an oiling system whereby the oil is more effectively fed to the bearing.

Another object is to provide an oil chamber of a character such as to cause oil to flow by centrifugal force to the pitman bearing.

A further object is to provide an improved means to take-up the bearing to compensate for wear.

In the accompanying drawings Figure 1 is a view of the outer side of the fly wheel.

Fig. 2 is a sectional view in the plane of line 2—2 of Fig. 1 looking in the direction of the arrows.

Fig. 3 is a perspective view of the bearing sleeve.

Fig. 4 is a view in the plane of line 4—4 of Fig. 2 looking in the direction of the arrows.

Fig. 5 is a view in the plane of line 5—5 of Fig. 2 looking in the direction of the arrows.

Referring to the accompanying drawings, the fly wheel 1 is externally of the type usually incorporated in mowers, reapers and like machines, it being herein shown as keyed on a shaft 2.

A wrist or crank pin 3 is positioned eccentrically on the outer side of the fly wheel 1 and secured thereto by any suitable means. In the present instance it has a screw-threaded portion 4 engaging a correspondingly threaded hole 5 in the fly wheel.

The fly wheel is cored out to provide therein an oil chamber 6 encircling the shaft and of such shape as to provide adjacent the crank pin 3 a recess 7 disposed a greater distance from the center of said fly wheel than is any other portion of the oil chamber. Thus when the fly wheel is rotating normally, oil contained in the chamber is caused to flow into the recess by centrifugal force, so as to maintain a supply of oil for the pitman bearing on the crank pin as long as there is any oil remaining in the oil chamber. For conducting the oil to the crank pin, the pin is bored to form an oil duct 8 which connects with the recess 7. Said oil duct comprises a longitudinal axial portion 9 and a radial portion 10 which terminates in a circumferential distributing groove 11 in the crank pin.

The pitman bearing comprises a bearing sleeve 12 of suitable material, herein shown as being split longitudinally as at 13. This sleeve is housed in a longitudinally slit box 14 on the end of a crank arm or pitman 15, and is prevented from turning in said box by a lug 16 engaging a correspondingly shaped notch 17 in the pitman box. The pitman box is retained on the crank pin and oil prevented from leaking from the bearing by suitable means such as a cap nut 18 engaging a correspondingly threaded portion 19 of the crank pin and fitting tightly against a shoulder 20 on said crank pin. A wide groove inside the pitman box forms in conjunction with the sleeve an arcuate reservoir 21. This groove terminates at opposite ends short of the slit 22 in the pitman box (Fig. 5) the parts being held in this relation by the interengaging lug 16 and notch 17. Holes such as 23 in the sleeve permit excess oil at the bearing surface to flow into said reservoir.

Suitable means to permit filling of the oil chamber may be provided, such as an opening normally closed by a screw plug 24.

From the foregoing it will readily be seen that when the fly wheel is rotating the oil forced by centrifugal pressure into the recess of the oil chamber continues through the duct of the crank pin into the circumferential groove and thence distributes over the surface of the pitman bearing. Excess oil fed to the distributing groove of the crank pin such as might be experienced due to the higher centrifugal pressure when the oil chamber has been freshly filled may pass through the holes 23 into the reservoir. As the oil supply in the oil chamber diminishes and the pressure at the bearing correspondingly decreases, the oil in the reservoir may flow back into the distributing groove and thence to the bearing surface to help lubricate the bearing. By this means the excess oil present at the bearing surface because of abnormal oil pressure, is collected in the auxiliary reservoir and thereby conserved until the oil pressure decreases.

The construction of the sleeve 12 is such as will permit take-up of the bearing to compensate for wear. This assists in the efficient lubrication of the bearing by preventing leakage of the oil such as would be experienced with a loose bearing.

To accomplish the take-up the pitman box 14 is provided with a pair of lugs 25 as shown in Figs. 1, 2 and 4, one on each side of the longitudinal slit 22. Suitable means such as a cap screw 26 is provided to draw the lugs 25 together. This action contracts the pitman box and thereby the sleeve 12 around the crank pin to take-up the bearing.

The width of the slit 13 in the bearing sleeve 12 may be equal to the thickness of said bearing sleeve and thereby permit take-up to the extent of one-half the thickness of the said sleeve. After this amount of take-up the bearing sleeve may be replaced.

To provide for accurate adjustment of the bearing and to retain that adjustment during the operation of the machine the cap screw 26 may have diametrical holes 27 at right angles to each other, either of said holes admitting a cotter pin 28. When a cotter pin is inserted in one of the holes the head of the cotter pin bears against a shoulder 29 on the pitman box 14 and prevents the cap screw 26 from turning. By this means take-up to the accuracy of one quarter turn of the cap screw is obtainable.

It will be seen that I have combined in a fly wheel having a crank pin associated therewith, a positive and effective oil feeding system together with effective means for conserving the oil and using it efficiently. Thus a long life for the bearing is insured and the annoyance and expense heretofore experienced effectually overcome.

While one embodiment of my invention has been selected for purposes of illustration, it is understood that various modifications may be made without departing from the scope of the following claims.

I claim as my invention:

1. In combination, a fly wheel having an oil reservoir with an outlet from which oil is fed by centrifugal force, a crank pin on the fly wheel adjacent said outlet, a split bearing sleeve on said crank pin, a pitman box housing said bearing sleeve and holding said sleeve against turning therein, said pitman box having a groove forming with the sleeve an arcuate reservoir partly around said sleeve, said sleeve and said crank pin having ducts therein communicating from the reservoir of said housing to the said outlet of the oil reservoir in the fly wheel, and means to retain said sleeve and box in position and to prevent oil leakage.

2. In combination, a mower fly wheel, a crank pin mounted eccentrically on said fly wheel, a sleeve on said crank pin, means to feed oil to the bearing surface of said crank pin, and a pitman box housing said sleeve, said pitman box having a groove forming with the sleeve a reservoir, said sleeve having a duct leading from said bearing surface to said reservoir whereby excess oil may flow into said reservoir.

3. In combination, a fly wheel having an oil reservoir with an outlet remote from the axis of rotation of the wheel wherefrom oil is fed by centrifugal force, a crank pin on said fly wheel adjacent said outlet, a bearing sleeve on said crank pin, a pitman box housing said bearing sleeve, said pitman box having a groove in its inner side forming with the sleeve an auxiliary oil reservoir, said crank pin having a duct establishing communication between the bearing surface of said crank pin and the outlet of said first mentioned reservoir and said sleeve having a duct communicating from said bearing surface to said auxiliary reservoir whereby excess oil may flow into said auxiliary reservoir.

4. In combination, a mower fly wheel having an internal oil reservoir encircling the axis of rotation, said oil reservoir having a recess at one point in its peripheral wall and being of such form that said recess is more remote from the axis of the wheel than is any other part of the oil reservoir, a crank pin mounted on said fly wheel adjacent said recess, said crank pin having an oil duct establishing communication between said recess and the bearing surface of the crank pin.

5. In combination, a fly wheel having an oil reservoir associated therewith for rotation with the fly wheel said reservoir having an outlet remote from the axis of the wheel, a crank pin on said fly wheel adjacent said outlet, said crank pin having a duct leading from the outlet of the reservoir to the bearing surface of said crank pin, a split sleeve on said crank pin, a longitudinally slit box housing said sleeve, said box having two radially projecting lugs one on each side of the slit, and means adapted to draw the lugs together thereby contracting said sleeve on said crank pin, and means on said crank pin to retain said sleeve and box in position and to prevent oil leakage.

6. In combination, a mower fly wheel, a crank pin mounted eccentrically on said fly wheel, a split sleeve on said crank pin, means to feed oil to the wearing surface of said crank pin, a pitman box housing said sleeve, said pitman box having a groove on the inner side forming with said sleeve an arcuate oil reservoir, means holding the sleeve against turning, said sleeve having a duct leading from the bearing surface of said crank pin to said reservoir, means to contract said sleeve on said crank pin and means to retain said sleeve and pitman box in position and to prevent oil leakage.

7. In combination, a mower fly wheel, a crank pin mounted eccentrically on said fly wheel, a split sleeve on said crank pin, means to feed oil to the wearing surface of said crank pin, a pitman box housing said sleeve, means holding the sleeve against turning, means to contract said sleeve on said crank pin, and means to retain said sleeve and pitman box in position and to prevent oil leakage.

In testimony whereof I have hereunto affixed my signature.

JOHN C. BOHMKER.